US008910692B2

(12) United States Patent
Jun et al.

(10) Patent No.: US 8,910,692 B2
(45) Date of Patent: Dec. 16, 2014

(54) LABEL ATTACHING DEVICE

(75) Inventors: Pilgoo Jun, Suwon-si (KR); Junsub Lee, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 349 days.

(21) Appl. No.: 12/923,946

(22) Filed: Oct. 15, 2010

(65) Prior Publication Data

US 2011/0146915 A1 Jun. 23, 2011

(30) Foreign Application Priority Data

Dec. 23, 2009 (KR) ........................ 10-2009-0129897

(51) Int. Cl.

*B32B 37/22* (2006.01)
*B65C 3/00* (2006.01)
*B65C 9/00* (2006.01)

(52) U.S. Cl.

CPC .... *B65C 3/00* (2013.01); *B65C 9/00* (2013.01)
USPC ........................................... 156/542; 156/541

(58) Field of Classification Search

USPC ................................. 156/500, 538, 541, 542
IPC .............................................. B32B 37/24,37/00
See application file for complete search history.

(56) References Cited

U.S. PATENT DOCUMENTS 4,028,167 A * 6/1977 Gerber .......................... 156/384
4,615,757 A * 10/1986 Treiber ......................... 156/350
4,891,088 A * 1/1990 Svyatsky ...................... 156/350
5,141,572 A * 8/1992 Gerber ............................ 156/64
5,230,765 A 7/1993 Weiselfish et al.
5,387,302 A * 2/1995 Bernard et al. ............... 156/352
5,674,335 A * 10/1997 Aman et al. .................... 156/64
5,895,555 A * 4/1999 Van Den Bergh ............ 156/556
6,298,275 B1 * 10/2001 Herman, Jr. .................. 700/130
6,308,602 B1 * 10/2001 Gerber ........................... 83/76.6
7,338,568 B2 * 3/2008 Lee et al. ........................ 156/64
8,012,279 B2 * 9/2011 Thiel et al. ...................... 156/64
8,109,391 B2 * 2/2012 Susnjara ........................ 209/3.3
2007/0095478 A1 * 5/2007 Dangami et al. .............. 156/358

FOREIGN PATENT DOCUMENTS

JP 61-077308 U 5/1986
JP 2005-178888 A 7/2005
KR 10 1992-0000578 A 1/1992
KR 1995-0023570 A 8/1995
KR 10 2005-0121114 A 12/2005
KR 10 2007-0006092 A 1/2007
KR 10-0853027 B1 8/2008

OTHER PUBLICATIONS

Korean Office Action in KR 10-2009-0129897, dated Nov. 17, 2011 (Jun, et al.).
Korean Notice of Allowance in KR 10-2009-0129897, dated Oct. 10, 2012 (Jun, et al.).
Chinese Office Action in CN 201010586226.1, dated Oct. 10, 2012 (Jun, et al.).
Chinese Office action dated May 20, 2014 (Jun, et al.).

* cited by examiner

*Primary Examiner* — Mark A Osele
(74) *Attorney, Agent, or Firm* — Lee & Morse, P.C.

(57) ABSTRACT

A label attaching device includes a substrate moving unit configured to move a substrate in a first direction, a labeler configured to attach a label to the substrate, and a first labeler moving unit coupled to the labeler, the first labeler moving unit being configured to move the labeler in the first direction.

19 Claims, 4 Drawing Sheets

LABEL ATTACHING DEVICE

BACKGROUND

1. Field

Embodiments relate to a label attaching device.

2. Description of the Related Art

Unlike primary batteries, i.e., non-rechargeable batteries, secondary batteries, i.e., rechargeable batteries, are batteries capable of being charged and discharged. For example, the secondary batteries may be used in portable electronic devices, e.g., mobile phones and camcorders.

A secondary battery may be manufactured by storing an electrode assembly formed with a separator interposed between electrodes having mutually different polarities in a case, and sealing the case. The electrodes of the electrode assembly may be manufactured by depositing active material on collectors, and may be slit at a required length to be used in a secondary battery. However, when contamination of the active material or pinhole defects of the collectors occur during electrode manufacturing, performance of the secondary battery may be reduced. Thus, electrodes that become defective during the electrode manufacturing process may be discarded.

SUMMARY

Embodiments are therefore directed to a label attaching device, which substantially overcomes one or more of the problems due to the limitations and disadvantages of the related art.

It is therefore a feature of an embodiment to provide a label attaching device with a mobile labeler capable of automatically attaching a label to a mobile or stationary substrate.

At least one of the above and other features and advantages may be realized by providing a label attaching device including a substrate moving unit configured to move a substrate in a first direction, a labeler configured to attach a label to the substrate, and a first labeler moving unit coupled to the labeler, the first labeler moving unit being configured to move the labeler in the first direction.

The labeler may be disposed above the substrate moving unit.

The attaching of the label may be performed with the substrate in a stationary state.

The substrate may be moved toward the labeler before or after being slit.

The first labeler moving unit may include a first moving part connected to a side of the labeler, and defining first teeth at a side thereof, a second moving part disposed above the first moving part, and defining second teeth in an outer periphery thereof that engage with the first teeth, and a motor disposed above the labeler, and connected to the second moving part, wherein the labeler may be moved in the direction parallel to the direction in which the substrate is moved, through the first moving part being moved by movement of the second moving part.

The first labeler moving unit may include a first moving part connected at a side of the labeler, and defining first teeth at a side thereof, and a piston connected to the first moving part, and driven to move the first moving part, wherein the labeler may be moved in the direction parallel to the direction in which the substrate is moved, through the first moving part being moved by operation of the piston.

The substrate moving unit may include a curved surface.

The substrate moving unit may include a flat surface.

The substrate may be disposed in plurality on the substrate moving unit, in a direction perpendicular to the direction in which the substrate is moved.

The substrate may be an electrode for a secondary battery.

The label may be attached to a defective portion of an electrode for a secondary battery.

The labeler may include a frame, an unwinder installed at a side of the frame, for unwinding a label sheet having a label attached to a sheet, an extruder installed at a side of the frame to be disposed beneath the unwinder, for separating the label from the label sheet and discharging the label toward the substrate, a presser installed at a side of the frame to be disposed proximate to an end of the extruder, for pressing the label onto the substrate, an ejector connected to a side of the frame to be disposed above the extruder, for ejecting the sheet from which the label has been separated, and a guide installed between the unwinder, the extruder, the presser, and the ejector, for moving the sheet.

The label attaching device may further include a holding unit coupled to the labeler and the first labeler moving unit, for holding the labeler and the first labeler moving unit, and a second labeler moving unit connected to the holding unit, for moving the labeler in a second direction perpendicular to the first direction in which the substrate is moved.

The substrate moving unit, the labeler, and the first labeler moving unit may be connected to a controller and operated through controlling of the controller.

At least one of the above and other features and advantages may also be realized by providing a label attaching device, including a substrate moving unit for moving a substrate, a labeler for attaching a label to the substrate, and a labeler moving unit coupled to the labeler, for moving the labeler in a direction perpendicular to a direction in which the substrate is moved.

The substrate may be disposed in plurality on the substrate moving unit in the direction perpendicular to the direction in which the substrate is moved.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
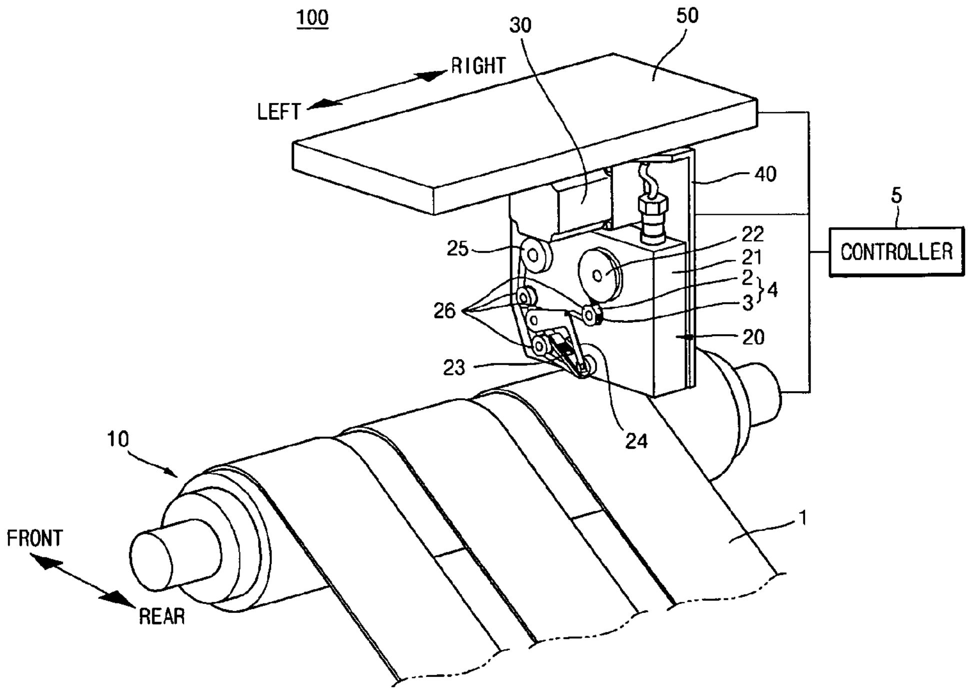
FIG. 1 illustrates a perspective schematic diagram of a label attaching device according to an embodiment.

Korean Patent Application No. 10-2009-0129897, filed on Dec. 23, 2009, in the Korean Intellectual Property Office, and entitled: "Label Attaching Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when an element or layer is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

A label attaching device according to an embodiment will be described hereinafter with reference to FIGS. 1-3. FIG. 1 illustrates a schematic perspective diagram of a label attaching device according to an embodiment, FIG. 2 illustrates a detailed perspective diagram of a first labeler moving unit in FIG. 1, and FIG. 3 illustrates a detailed side diagram of a labeler in FIG. 1.

Figure 2:
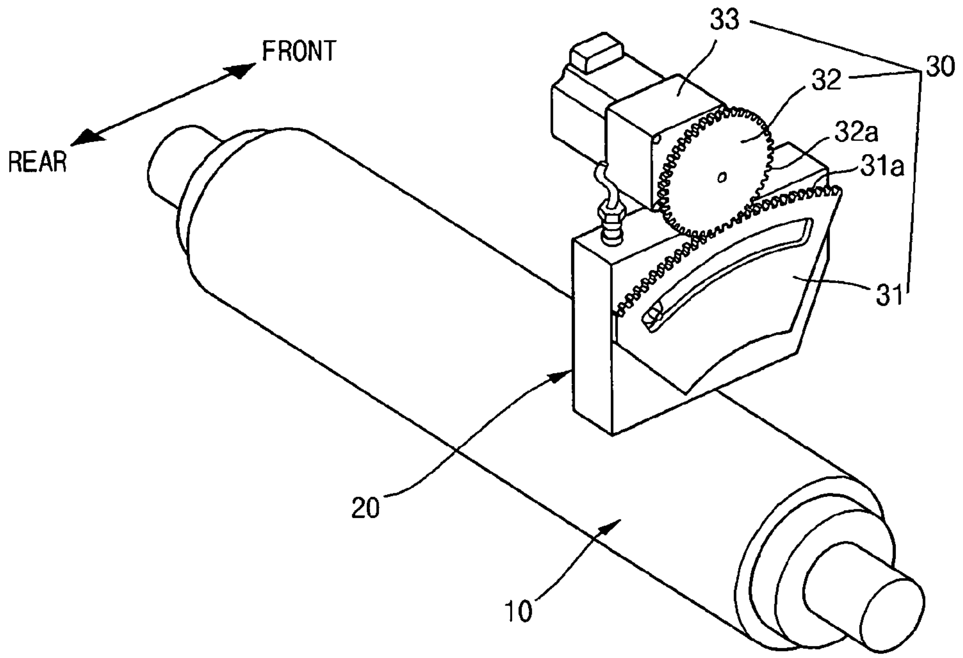
FIG. 2 illustrates a detailed perspective diagram of a first labeler moving unit in FIG. 1.
Figure 3:
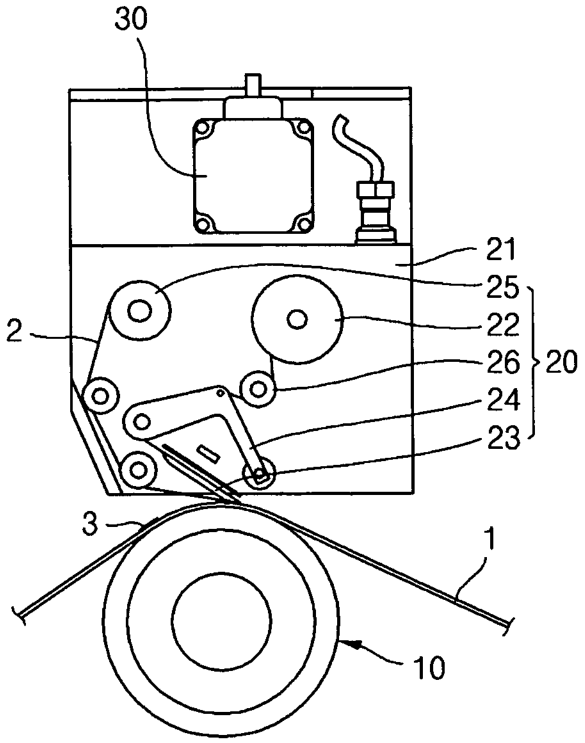
FIG. 3 illustrates a detailed side diagram of a labeler in FIG. 1.

Referring to FIGS. 1 to 3, a label attaching device 100 according to an embodiment may include a substrate moving unit 10, a labeler 20, a first labeler moving unit 30, a holding unit 40, and a second labeler moving unit 50.

The substrate moving unit 10 may be disposed below the labeler 20 to support a substrate 1. That is, the substrate moving unit 10 may provide a space on which a label 3 may be attached to the substrate 1, and may move the substrate 1 toward the labeler 20. For example, the substrate moving unit 10 may be configured as a roller that rotates or as a conveyor belt that moves linearly, so a surface of the substrate moving unit 10 may be curved or flat, respectively. The substrate moving unit 10 may be driven by a controller 5 to move or stop the substrate 1. The substrate 1 may be positioned on the substrate moving unit 10, such that movement of the substrate moving unit 10 may move the substrate 1 along a lengthwise direction of the substrate 1. The substrate moving unit 10 may support a single substrate 1 or a plurality of substrates 1 adjacent to each other along a direction perpendicular to a direction in which the substrates 1 are moved.

The substrate 1 may be an electrode for a secondary battery, and the electrode may be manufactured by depositing an active material on a collector. In this manufacturing process, defects may occur in the electrode. Therefore, it may be required to attach labels to defective portions of the electrode to indicate their defectiveness. Any type of substrate 1 that requires labels to be attached may be used, and substrates are not limited to any particular type in embodiments. Here, the substrate 1 may be moved toward the labeler 20 before or after it has been slit. The slitting refers to a process in which a required amount of the substrate 1 is cut in order to be used for a secondary battery. Below, a description of the substrate 1 embodied as an electrode employed in a secondary battery will be provided as an example.

The labeler 20 may be disposed above the substrate moving unit 10, may provide the label 3 via use of a controller 5, and may attach the label 3 to a defective portion of the substrate 1. As illustrated in FIGS. 1 and 3, the labeler 20 may include a frame 21, an unwinder 22, an extruder 23, a presser 24, an ejector 25, and a guide 26.

The frame 21 may define a body of the labeler 20, and may have components built-in for receiving control signals from the controller 5. The frame 21 may have a polyhedral structure, e.g., a cuboid or a heptagonal prism.

The unwinder 22 may be installed on one side of the frame 21, e.g., on a polygonal base of the polyhedral structure. The unwinder 22 may be configured to unwind a label sheet 4 with a label 3 attached to a surface of a sheet 2, and may include a rotatable unwinding roller.

The extruder 23 may be installed on one side of the frame 21 below the unwinder 22. The extruder 23 may receive an unwound label sheet 4 from the unwinder 22, may separate the label 3 from the label sheet 4, and may discharge the label 3 toward the substrate 1. The extruder 23 may include a fixed plate (not shown).

The presser 24 may be installed on one side of the frame 21 in proximity to the extruder 23. The presser 24 may press the label 3 separated by the extruder 23 against a defective portion of the substrate 1, and may include a pressing roller.

The ejector 25 may be on one side of the frame 21 above the extruder 23. The ejector 25 may eject the sheet 2 separated from the label sheet 4 after passing the end of the extruder 23, and may include an ejecting roller capable of rotating.

The guide 26, e.g., a plurality of guides 26, may be installed on one side of the frame 21, e.g., one guide may be positioned between each two of the unwinder 22, extruder 23, presser 24, and ejector 25. The guide 26 may guide and move the sheet 2 between the unwinder 22, extruder 23, presser 24, and ejector 25, and may include a guide roller.

For example, the labeler 20 may attach the label 3 to a defective portion of a mobile substrate 1, e.g., the labeler 20 may be stationary while attaching the label 3 to a defective portion of a substrate 1 moving from rear to front. In another example, the labeler 20 may attach the label 3 to a defective portion of a stationary substrate 1, e.g., the labeler 20 may move from rear to front while attaching the label 3 to the stationary substrate 1. The labeler 20 may further attach labels 3 on defective portions of a plurality of substrates 1 that are in a stationary state, e.g., by moving to left or right to position above the defective portions. The movement of the labeler 20 may be controlled by the first labeler moving unit 30 and/or the second labeler moving unit 50.

The first labeler moving unit 30 may be coupled to the labeler 20, and may move the labeler 20 in a direction parallel to a movement direction of the substrate 1 via a controller 5. In particular, the first labeler moving unit 30 may move the labeler 20 in a direction from front to rear or from rear to front in order to position an end of the extruder 23 above a defective portion of the stationary substrate 1. For example, when the end of the extruder 23 is positioned above the defective portion of the substrate 1, the first labeler moving unit 30 may move the labeler 20 in a direction from rear to front in order to attach the label 3 provided by the extruder 23 to the defective portion of the substrate 1 by means of the presser 24. In another example, when the end of the extruder 23 is positioned above the defective portion of the substrate 1, the labeler 20 may be stopped and the substrate 1 may be moved by the substrate moving unit 10, so the label 3 provided by the labeler 20 may be attached to a defective portion of the substrate 1. As illustrated in FIG. 2, the first labeler moving unit 30 may be configured to include a first moving part 31, a second moving part 32, and a motor 33.

The first moving part 31 may be installed on one side of the labeler 20, e.g., on a side of the frame 21 opposite the unwinder 22. The first moving part 31 may include first teeth **31*a* formed in a side thereof, e.g., along an edge of the first moving part 31. By moving in a direction from front to rear or from rear to front, the first moving part 31 may move the labeler 20** in a direction from front to rear or from rear to front, i.e., along a first direction.

The second moving part 32 may include second teeth **32*a* at an outer periphery thereof. The second teeth 32*a* of the second moving part may engage with the first teeth 31*a* of the first moving part 31, so the second moving part 32 may move the first moving part 31** in a direction from front to rear or from rear to front.

The motor 33 may be disposed above the labeler 20, may be connected by a separate fixing device (not shown), and may have the second moving part 32 coupled to a side thereof. The motor 33 may be driven by a power source (not shown) in order to rotate the second moving part 32.

The first labeler moving unit 30 may move the labeler 20 in a direction parallel to the direction in which the substrate 1 is moved, e.g., in a stationary state of the substrate moving unit 10, to enable the label 3 to be attached to a defective portion along the lengthwise direction of the substrate 1. Also, when the first labeler moving unit 30 cannot attach the label 3 to a defective portion of the substrate 1 at which a defect occurs due to a mechanical error, the substrate 1 may be moved by the substrate moving unit 10 in a direction from front to rear to allow attachment of the label 3 to the defective portion of the substrate 1.

As illustrated in FIG. 1, the holding unit 40 may connect the labeler 20 and the first labeler moving unit 30. That is, the holding unit 40 may be coupled to a side of each of the labeler 20 and the first moving unit 30 via a separate fixing device (not shown).

The second labeler moving unit 50 may be coupled as a plate at a top of the holding unit 40, and may be controlled by a controller 5 to move the labeler 20 in a second direction, i.e., a direction perpendicular to a direction in which the substrate 1 is moved. For example, in a stationary state of the plurality of substrates 1 arranged on the substrate moving unit 10, the second labeler moving unit 50 may move the labeler 20 in a left or right direction to position the end of the extruder 23 above a defective portion of a desired substrate 1 of the plurality of substrates 1. When the end of the extruder 23 is positioned above a defective portion of the substrate 1, the first labeler moving unit 30 may move the labeler 20 in a direction from rear to front to attach the label 3 provided by the extruder 23 on the defective portion of the substrate 1 by means of the presser 24. When the end of the extruder 23 is positioned above the defective portion of the substrate 1, the labeler 20 may be stopped and the substrate 1 may be moved by the substrate moving unit 10 to enable the label 3 provided by the labeler 20 to be attached to the defective portion of the substrate 1.

The second labeler moving unit 50 may move the labeler 20 in a direction perpendicular to the direction in which the plurality of substrates 1 is moved in a stationary state of the substrates 1 in order to enable labels 3 to be attached to defective portions of the substrates 1 in a width direction. Accordingly, when attaching labels to defective portions of a plurality of arranged substrates 1, the second labeler moving unit 50 allows use of a single labeler 20.

The above-described components of the label attaching device 100 may be connected to a controller 5 and may be operated via the controller 5. When the label 3 is attached to a defective region of the substrate 1 as described above, the substrate 1 may be moved to another process.

The label attaching device 100 as described in embodiments above may include the labeler 20 with the first labeler moving unit 30 moving in front and rear directions, so that labels 3 may be attached to defective portions of both mobile and stationary substrates 1. Therefore, the labels 3 may be attached to defective portions of the substrates 1, even when the labels 3 fail to initially attach to the substrates 1 due to a mechanical error.

Additionally or alternatively, the label attaching device 100 as described in embodiments above may include the labeler 20 with the second labeler moving unit 50 moving in left and right directions, so that a labels 3 may be attached to any defective portion among a plurality of substrates 1 arranged on a substrate moving unit 10. Thus, in attaching labels 3 to defective portions on a plurality of arranged substrates 1, the label attaching device 100 according to embodiments may use a single labeler 20, thereby reducing manufacturing costs.

Figure 4:
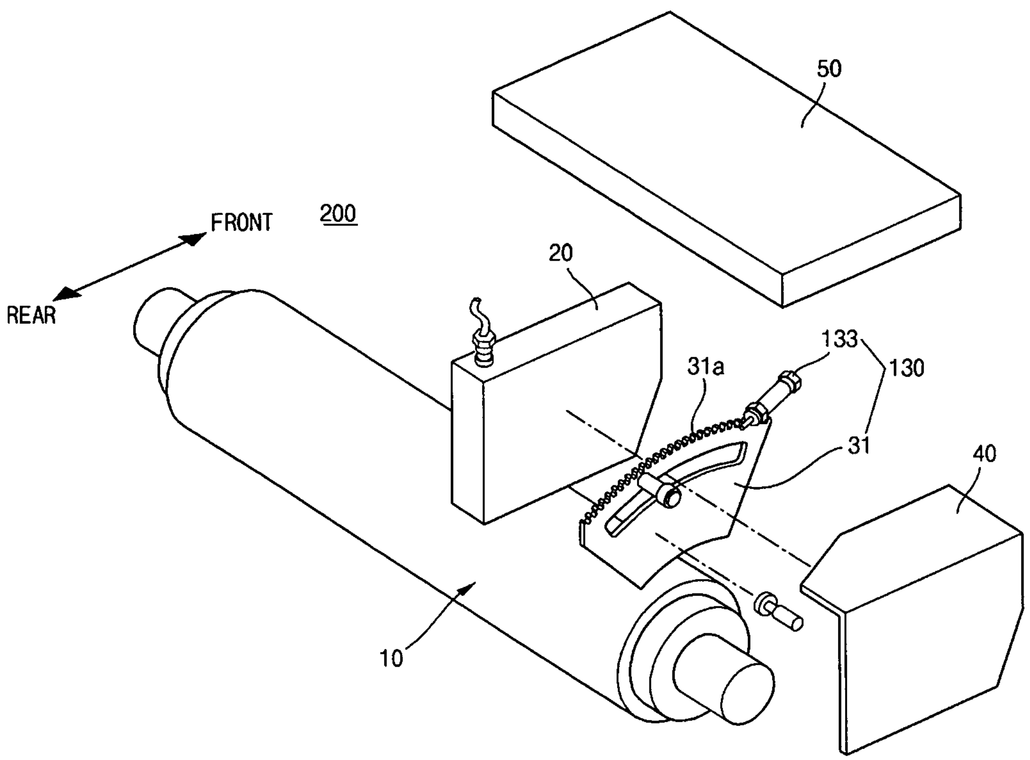
FIG. 4 illustrates an exploded perspective schematic diagram of a label attaching device according to another embodiment.

Next, a label attaching device according to another embodiment will be described with reference to FIG. 4. FIG. 4 illustrates an exploded perspective diagram schematically illustrating a label attaching device according to another embodiment.

Referring to FIG. 4, a label attaching device 200 may be substantially the same as the label attaching device 100 described previously with reference to FIGS. 1-3, with the exception of a configuration of a first labeler moving unit 130. Therefore, only the first labeler moving unit 130 will be described hereinafter in detail.

The label attaching device 200 according to another embodiment may include the substrate moving unit 10, the labeler 20, the first labeler moving unit 130, the holding unit 40, and the second labeler moving unit 50. The first labeler moving unit 130 may be similar to the first labeler moving unit 30 in FIG. 2 and may perform the same function. However, the first labeler moving unit 130 may be configured to include a piston 133 instead of the second moving part 32 and motor 33 in FIG. 2.

In detail, as illustrated in FIG. 4, the first label moving unit 130 may include the first moving part 31 with the first teeth 31*a* and the piston 133. The piston may move the first moving part 31 via the first teeth 31*a* from front to rear or from rear to front in order to move the labeler 20. As the first labeler moving unit 130 moves the labeler 20 simply with the first moving part 31 and the piston 133, manufacturing costs may be reduced.

Next, a brief description will be provided with respect to operation of the label attaching device 100 according to an embodiment.

First, the substrate 1 may be prepared by depositing an active material on at least one surface of a collector. The substrate 1 may be disposed on the substrate moving unit 10 and may be moved in a lengthwise direction of the substrate 1 to pass beneath the labeler 20.

For example, when a defective portion of the substrate 1 is disposed beneath the labeler 20 during the process of moving the substrate 1 beneath the labeler 20, the label 3 may be provided and attached to the defective portion of the substrate 1 by the labeler 20. The substrate 1 may be continuously moved by the substrate moving unit 10, and the labeler 20 may be stationary while providing the label 3 onto the substrate 1.

In another example, when a defective portion of a substrate 1 is disposed beneath the labeler 20 during the process of moving the substrate 1 beneath the labeler 20, the labeler 20 may move in a direction from rear to front, and the label 3 may be provided and attached to the defective portion of the substrate 1. That is, when the defective portion of the substrate 1 is disposed beneath the labeler 20, the substrate 1 may be in a stationary state, and the labeler 20 may be in a moving state for providing the label 3 to attach to the defective portion of the substrate 1.

In yet another example, when the labeler 20 moves to the left or right direction and is disposed above a defective portion from among a plurality of substrates 1 during the process of moving the substrates 1 beneath the labeler 20, the labeler 20 may move in a direction from rear to front and provide the label 3 to the defective portion of a substrate 1. That is, the substrate 1 may be in a stationary state when the labeler 20 moves to the left or right direction and in a direction from the rear to front. And, the labeler 20 may be in a moving state when providing the label 3 for attaching to a defective portion from among the plurality of substrates 1.

When the labeler 20 moves to left or right direction and is disposed above a defective portion among a plurality of substrates 1 during the process of moving the substrates 1 beneath the labeler 20, while the substrates 1 are being moved, the label 3 may be provided by the labeler 20 and may be attached to a defective portion among the plurality of substrates 1. That is, the substrates 1 may be in a stationary state when the labeler 20 is moving to the left or right direction and in a direction from rear to front, and the substrates 1 may be in a moving state when the label 3 is provided. Also, the labeler 20 may be in a moving state while moving to a position above a defective portion among the plurality of substrates 1, and the labeler 20 may be in a stationary state when the label 3 is provided.

A label attaching device according to an embodiment may be provided with a labeler to which a first labeler moving unit moving in the front and rear directions is coupled, so that a label may be attached to a defective portion not only in a moving state of the substrate, but also in a stationary state of the substrate. That is, a substrate moving unit of the label attaching device may be stationary during operation of the labeler. Therefore, a label may be attached to a defective portion of a substrate after a mechanical error causes a failed initial attempt at attaching the label to the defective portion of the substrate. As such, electrodes that become defective during the electrode manufacturing process may be efficiently labeled and discarded.

Further, because a label attaching device according to an embodiment may be provided with a labeler to which a second labeler moving unit moving in the left and right directions is coupled, a label may be attached to any defective portion among a plurality of substrates on the substrate moving unit. Accordingly, a label attaching device according to an embodiment may use a single labeler to reduce manufacturing costs.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A label attaching device, comprising:

a substrate moving unit configured to move a substrate in a first direction;

a labeler configured to attach a label to the substrate;

a first labeler moving unit coupled to the labeler, the first labeler moving unit being configured to move the labeler in the first direction;

a holding unit coupled to the labeler and the first labeler moving unit, the holding unit being configured to hold the labeler and the first labeler moving unit; and a second labeler moving unit connected to the holding unit, the second labeler moving unit being configured to move the labeler in a second direction perpendicular to the first direction, such that the first and second labeler moving units are configured to move the same labeler in a horizontal direction and in a longitudinal direction, the holding unit having an inverted L-shaped cross-section, the first and second labeler moving units being on perpendicular surfaces of the holding unit.

2. The label attaching device as claimed in claim 1, wherein the first labeler moving unit is configured to move the labeler only in the first direction, and the second labeler moving unit is configured to move the labeler only in the second direction.

3. The label attaching device as claimed in claim 1, wherein the first labeler moving unit includes:

a first moving part connected to the labeler and including first teeth, the first moving part being configured to move the labeler; and a piston connected to the first moving part and configured to move the first moving part.

4. The label attaching device as claimed in claim 1, wherein the substrate moving unit includes a curved surface, the substrate being configured to move on the curved surface.

5. The label attaching device as claimed in claim 1, wherein the substrate moving unit includes a flat surface, the substrate being configured to move on the flat surface.

6. The label attaching device as claimed in claim 1, wherein the first and second labeler moving units are attached to a same labeler, the first and second labeler moving units being configured to move the same labeler independently of each other and in respective first and second directions.

7. The label attaching device as claimed in claim 1, wherein the substrate is an electrode for a secondary battery.

8. The label attaching device as claimed in claim 7, wherein the substrate moving unit is configured to move the substrate toward the labeler before or after cutting the substrate to define the electrode.

9. The label attaching device as claimed in claim 7, wherein the labeler is configured to attach the label to a defective portion of the electrode.

10. The label attaching device as claimed in claim 1, wherein the labeler includes:

a frame;

an unwinder on the frame and configured to unwind a label sheet having a label on a sheet;

an extruder on the frame below the unwinder, the extruder being configured to separate the label from the label sheet and to discharge the label toward the substrate;

a presser on the frame proximately to the extruder, the presser being configured to press the label onto the substrate;

an ejector connected to the frame above the extruder, the ejector being configured to eject the sheet from which the label has been separated; and at least one guide between at least two of the unwinder, the extruder, the presser, and the ejector, the guide being configured to move the sheet.

11. The label attaching device as claimed in claim 10, wherein:

the first labeler moving unit includes a first moving part connected to the frame of the labeler, the first moving part and the unwinder of the labeler being on opposite side of the frame, and the first moving part including first teeth and being configured to move the labeler; and the first labeler moving unit is between the frame and the holding unit.

12. The label attaching device as claimed in claim 11, wherein the first labeler moving unit further comprises:

a second moving part above the first moving part and including second teeth configured to engage with the first teeth and move the first moving part along the first direction; and a motor above the frame of the labeler and connected to the second moving part along the second direction.

13. The label attaching device as claimed in claim 11, wherein the first labeler moving unit further comprises a piston connected to the first moving part and configured to move the first moving part.

14. The label attaching device as claimed in claim 11, wherein the second labeler moving unit overlies the first labeler moving unit and the holding unit.

15. The label attaching device as claimed in claim 1, wherein the substrate moving unit, the labeler, and the first labeler moving unit are connected to a controller.

16. The label attaching device as claimed in claim 1, wherein the second labeler moving unit is configured to move the labeler along multiple paths spaced apart from each other along the second direction, the same labeler being configured to sequentially move over the multiple paths in the first and second directions.

17. The label attaching device as claimed in claim 1, wherein the first labeler unit is configured to move in a different direction relative to the second labeler unit, the directions of the first and second labeler units corresponding to the first and second moving directions of the labeler, respectively.

18. A label attaching device, comprising:

a substrate moving unit configured to move a substrate in a first direction;

a labeler configured to attach a label to the substrate; and a first labeler moving unit coupled to the labeler, the first labeler moving unit being configured to move the labeler in the first direction, wherein the first labeler moving unit includes:

a first moving part connected to the labeler and including first teeth, the first moving part being configured to move the labeler, a second moving part disposed above the first moving part and including second teeth, the second teeth being configured to engage directly with the first teeth of the first moving part and move the first moving part, and a motor disposed above the labeler and connected to a portion of the second moving part that has no teeth.

19. A label attaching device, comprising:

a substrate moving unit configured to move simultaneously a plurality of substrates in a first direction, a width of the substrate moving unit in a second direction being configured to support the plurality of substrates spaced apart from each other along the second direction perpendicular to the first direction;

a labeler configured to sequentially attach a label to each of the plurality of the substrates;

a labeler moving unit coupled to the labeler, the labeler moving unit being configured to move the labeler in the second direction across the entire width of the substrate moving unit, and in the first direction along multiple paths spaced apart from each other along the second direction, a same labeler being configured to sequentially move over the multiple paths in the first and second directions; and a holding unit coupled to the labeler and the labeler moving unit, the holding unit having an inverted L-shaped cross-section.

* * * * *